United States Patent [19]

Ostrowski

[11] 4,224,598
[45] Sep. 23, 1980

[54] VEHICLE REACTION SIGNAL

[76] Inventor: Joseph F. Ostrowski, 2470 Begonia Pl., Santa Cruz, Calif. 95062

[21] Appl. No.: 19,107

[22] Filed: Mar. 9, 1979

[51] Int. Cl.³ .............................................. B60Q 1/26
[52] U.S. Cl. ........................................ 340/66; 340/94
[58] Field of Search ...................... 340/66, 69, 71, 72, 340/93, 94

[56] References Cited

U.S. PATENT DOCUMENTS

| 2,957,161 | 10/1960 | Daws | 340/66 |
| 3,676,844 | 7/1972 | Hendrickson | 340/66 |

Primary Examiner—Alvin H. Waring
Attorney, Agent, or Firm—Robert G. Slick

[57] ABSTRACT

A reaction signal for an automobile is provided whereby the driver of a car following the car equipped with the reaction signal will know whether the driver in front is accelerating, coasting, or braking.

1 Claim, 2 Drawing Figures

VEHICLE REACTION SIGNAL

SUMMARY OF THE INVENTION

The present invention relates to a reaction signal to be installed on a car whereby the driver of a car following will know whether the car in front of him is accelerating, coasting or braking. At the present time, cars are ordinarily equipped with only a brake light which does not give the maximum warning to a following car. In other words, the driver frequently takes his foot off of the accelerator to slow down and coast for a considerable period of time prior to the application of brakes, should such be required. If the following driver had a warning of the coasting period, he would be in a much better position to keep his distance, anticipating that the car in front of him might come to a sudden stop.

I am aware of the fact that a number of prior proposals have been made for accomplishing a somewhat similar purpose. However, all of the prior art devices have suffered some deficiency which the present invention remedies.

Some systems have employed three lights, such as a green light for acceleration, an amber light for coasting, and a red light for the application of brakes. One difficulty with such systems, aside from their complication and the expense of adding such a system to an existing car, is the fact that in many states the color of signal lights is prescribed by law, and a green light on the rear of a vehicle is not permitted.

Other systems have employed amber and red lights, both of which are permitted by law, but have involved very special and complicated switches which are expensive to manufacture and install.

Still other systems have suffered from the deficiency that when the brake pedal is released, the stop lights will go off but there will be no indication as to whether the car in front is now coasting or accelerating.

The reaction signal of the present invention is extremely simple and involves the use of only the red and amber lights which are now standard equipment on all vehicles.

Further, the reaction signal of the present invention employs only conventional switches which are standard and inexpensive to procure and easy to install so that a very low-cost system can be provided. Also, in accordance with a preferred embodiment, the usual backup lights are utilized, minimizing the changes to the existing car light system.

Various other objects and advantages of the invention will be brought out in the balance of the specification.

DESCRIPTION OF THE PREFERRED EMBODIMENT

Figure 1:
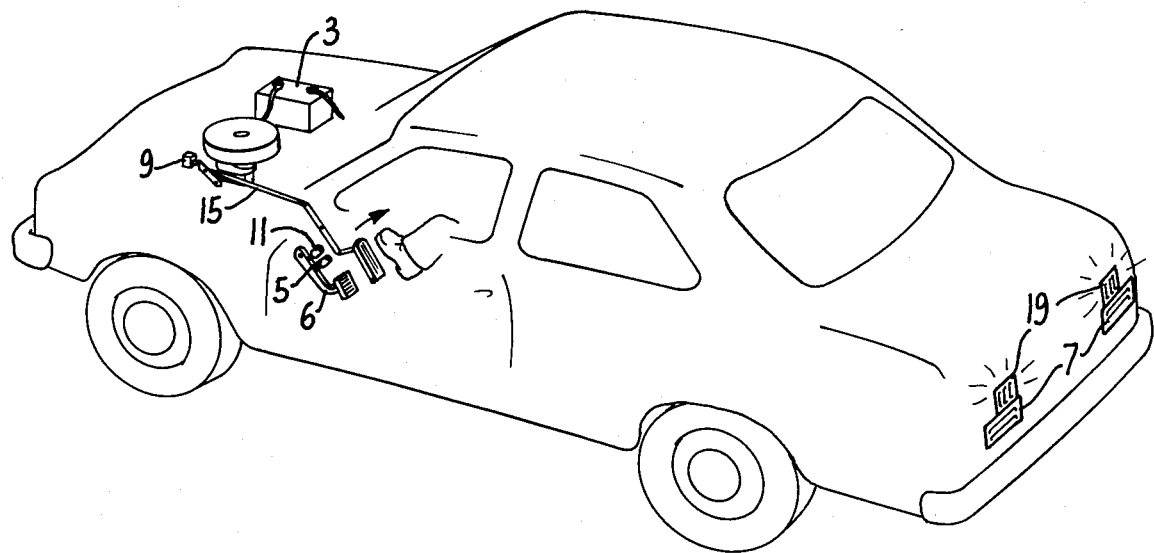
FIG. 1 is a perspective view of an automobile with the system of the present invention installed, showing certain of the parts cut away.
Figure 2:
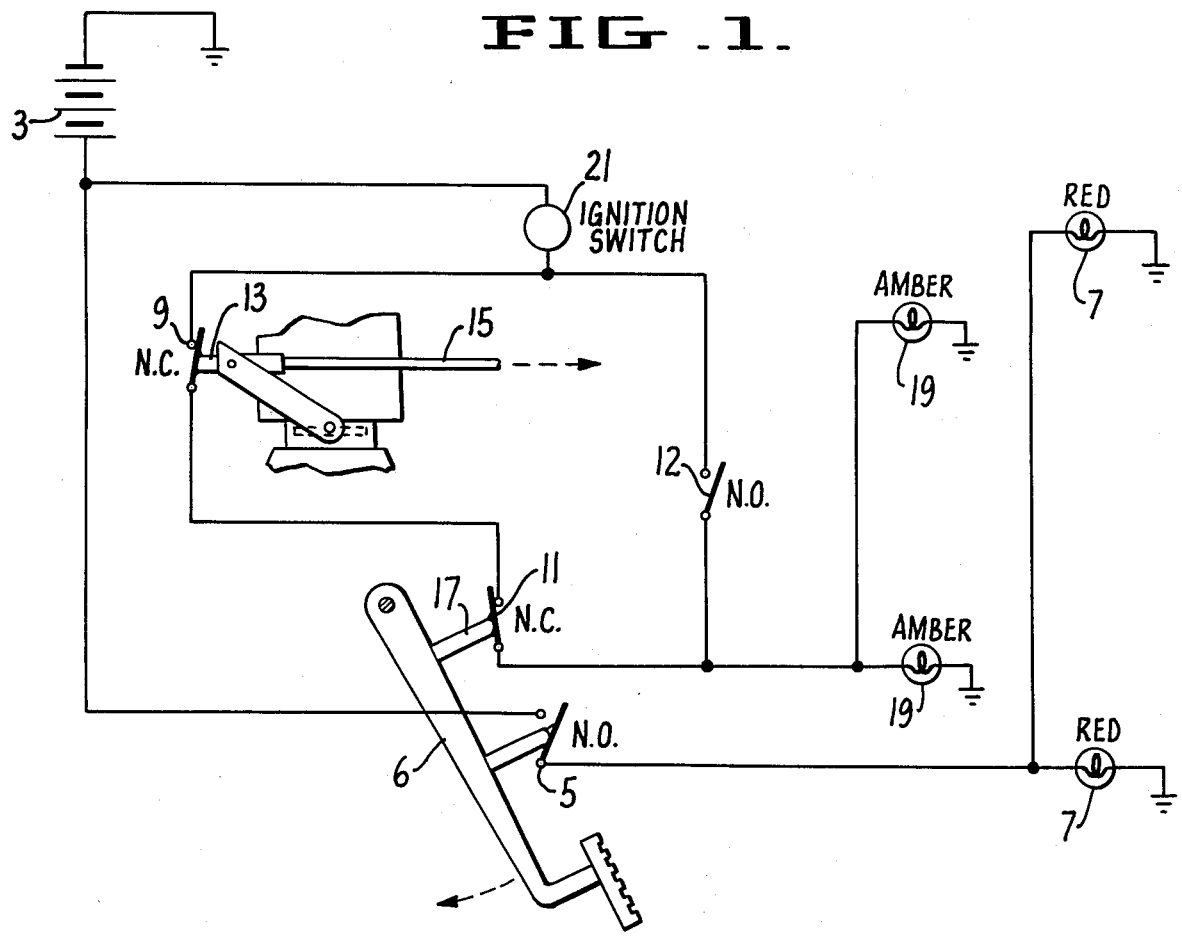
FIG. 2 is a schematic diagram of a preferred embodiment of the invention.

The present invention provides a reaction signal to warn a following driver utilizing amber and red lights wherein the reaction signal operates in four phases:

In the first phase, when the operator of the preceding vehicle releases the accelerator, amber reaction signal lights go on.

In the second phase, when the brakes are applied, the amber reaction lights go off and the red stop lights go on.

In the third phase, when the operator releases the brakes, the stop lights will go off and the amber reaction signal will again go on.

The amber reaction signal will stay on until in the fourth and final phase when the operator depresses the accelerator, whereupon the amber reaction signal will go off to complete the cycle and to set the system up for a repetition of the cycle.

Before describing the switches added in the course of the present invention, the existing electrical equipment will be briefly described. Current from the battery 3 is applied to the normally open switch 5 which is mounted on the brake pedal 6 and which is connected to the red stop lights 7. When the brake 6 is applied, switch 5 closes, switching on the red lights as is well known. In the embodiment shown, the red stop lights operate independent of the ignition switch and in some systems, the stop lights would be wired to the ignition switch rather than directly to the battery, so that the stop lights would operate only when the ignition switch is turned on. This, of course, has nothing to do with the present invention.

In accordance with the present invention, two normally closed switches of standard design, namely 9 and 11, are provided. Switch 9 is actuated by a connection 13 from the throttle linkage 15, it being understood that the throttle of the vehicle is closed when link 15 is in its left position and as the link 15 moves to the right, the throttle of the vehicle is opened and switch 9 is opened.

Switch 9 is wired in series to switch 11 which is placed adjacent to the brake pedal 6 and opened by arm 17 on the brake pedal when the pedal is depressed. Switch 11 in turn leads to the amber lights 19. Since switches 9 and 11 are in series and are connected through the ignition switch 21 to the vehicle's electrical system, it is apparent that lights 19 will light up only when the ignition switch 21 is on, switch 9 is closed (i.e., linkage 15 is to the left) and switch 11 is closed (i.e., the brake pedal 6 has not been depressed).

A preferred method of carrying out the invention is to place the switches 9 and 11 in parallel with the switch 12 of the backup lights. One can then replace the usual white bulbs of the backup lights with amber bulbs. The backup lights will then be amber, but this causes no practical difficulty since the amber bulbs give adequate lighting while backing.

It is believed now that the operation of the switch system is apparent. When one first gets into the vehicle and turns the ignition switch 21 on, the driver would ordinarily depress the accelerator, opening switch 9 so that the amber lights would not come on. Even if the accelerator is not depressed, the car would be in a stationary position so that it would not be important whether or not the amber lights came on. In any event, as the driver moves off, the accelerator 15 would be depressed, opening switch 9, so that neither the amber not the red lights would be on. Now, if the operator releases the accelerator to coast, linkage 15 moves to the left closing switch 9 putting on the amber lights 19 so that a following driver wil be warned that the car in front of him is coasting. Now, if the operator depresses the brakes, switch 5 will close and switch 11 will open, which will turn on the red lights and turn off the amber lights. Now, if the operator releases the brake, the red light will go off and the amber lights will come on due to the closing of switch 11. When the operator again accelerates, the amber lights will go off to complete the cycle and place the system in a condition for a repetition of the cycle.

I claim:

1. In a reaction signal warning system for a vehicle equipped with a brake pedal and a switch connected thereto whereby said brake pedal turns on a stop light when said pedal is depressed said vehicle also having a backup light with a switch for turning on said backup light, said backup light being of a different color from said stop light, the improvement comprising:

a first switch activated by the accelerator of the vehicle wherein said switch is closed when the throttle of the vehicle is closed and is opened as the throttle on the vehicle is opened and a second switch activated by the brake pedal, said second switch being closed when said brake pedal is not depressed and being open when said brake pedal is depressed, said first and second switches being in series with each other, the combination of said first and second switches being in parallel with said backup light switch of the vehicle whereby said backup light is lighted when the throttle of the vehicle is closed and is off when said brake pedal is activated.

* * * * *